US007337652B2

(12) United States Patent
Shamine

(10) Patent No.: US 7,337,652 B2
(45) Date of Patent: Mar. 4, 2008

(54) FUEL SYSTEM WITH LEAK LOCATION DIAGNOSTIC FEATURES AND COMPONENT FOR SAME

(75) Inventor: David M. Shamine, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 500 days.

(21) Appl. No.: 10/691,318

(22) Filed: Oct. 22, 2003

(65) Prior Publication Data

US 2006/0130560 A1 Jun. 22, 2006

(51) Int. Cl.
*G01M 3/04* (2006.01)
*G01M 3/16* (2006.01)

(52) U.S. Cl. ............................ 73/40; 73/49.2; 73/49.7; 73/119 A

(58) Field of Classification Search .................... 73/40, 73/49.2, 49.7, 119 A; 72/119 A
See application file for complete search history.

(56) References Cited

U.S. PATENT DOCUMENTS 4,269,061 A 5/1981 Hatsuno et al.
5,685,268 A 11/1997 Wakemen
5,715,786 A 2/1998 Seiberth
6,237,569 B1 5/2001 Stelzer et al.
6,817,343 B1 * 11/2004 Greco et al. ................ 123/497
7,051,576 B2 * 5/2006 Hutchinson et al. ..... 73/40.5 R
2002/0044060 A1 * 4/2002 Berg .......................... 340/605

OTHER PUBLICATIONS

Detroit Diesel Technician Guide; Series 4000 Common Rail Fuel System; 2001; 210 Pages; Daimler Chrysler Company.

* cited by examiner

*Primary Examiner*—Daniel S. Larkin
(74) *Attorney, Agent, or Firm*—Liell & McNeil

(57) ABSTRACT

A leak diagnostic strategy for an engine equipped with a high pressure common rail fuel system includes a plurality of separate leak lines. Each of the leak lines is constructed and positioned to capture fuel leaking from one of several different high pressure spaces associated with the fuel system. Once a leak is detected, the location of the leak can be diagnosed by opening different leak diagnostic ports until fuel is evacuated from the system. Each of the leak diagnostic ports is associated with one of the leak lines. The system allows for quick determination of a leak location without cumbersome testing or partial dismantlement of engine related subsystems and components.

16 Claims, 3 Drawing Sheets

FUEL SYSTEM WITH LEAK LOCATION DIAGNOSTIC FEATURES AND COMPONENT FOR SAME

TECHNICAL FIELD

The present invention relates generally to a strategy for diagnosing a leak location in a high pressure fuel system, and more particularly to a common rail fuel system with leak location diagnostic features.

BACKGROUND

Common rail fuel systems typically include at least one common rail that supplies high pressure fuel to a plurality of fuel injectors, and at least one high pressure pump that supplies high pressure fuel to the common rail(s). These high pressure spaces in an engine's fuel system are fluidly connected to one another through pipes that are located on the engine. Although leakage in these types of fuel systems is rare, it does occur. In order to contain any leak from the high pressure spaces, it is sometimes useful to contain these high pressure spaces within a low pressure envelope. For instance, a high pressure supply line might actually be a double walled tube with the inner tube containing high pressure fuel, and the outer tube enclosing the inner tube and being fluidly connected to drain in order to return any leaked fluid back to tank. For instance, U.S. Pat. No. 6,237,569 to Stelzer et al. teaches the formation of an internal leakage chamber that hermetically encloses lines and connections associated with a common rail fuel system.

In addition to containing leaks, there is an issue relating to detecting leaks. For instance, U.S. Pat. No. 5,685,268 to Wakeman teaches a fuel leakage detector system that issues an alert if the total amount of fuel leaving a high pressure area in the fuel system is less than the mass of fuel entering the same. Although Wakeman and others have taught methods of detecting a fuel leak in a high pressure common rail system, the problem of diagnosing a leak location in order to repair the same can remain elusive and problematic. In other words, detecting a leak is useful, but detection alone will not aid a technician in locating and repairing the leak. Thus, substantial down time and the associated expense can be involved in tracking down and repairing a leak. This can be further compounded in some engine applications where the various high pressure spaces in the fuel system are at different locations that are difficult to access. For instance, some high pressure spaces might require disassembly of other engine related components in order to gain access thereto.

The present invention is directed to one or more of the problems set forth above.

SUMMARY OF THE INVENTION

In one aspect, a leak diagnosis component includes a junction block with a plurality of inlets and at least one outlet that open through an external surface. The inlets are fluidly connected to the outlet via a plurality of leak paths disposed in the junction block. A separate leak collection cavity is fluidly connected to each of the leak paths, and is disposed in the junction block. A separate leak diagnostic port extends between each of the leak collection cavities and the external surface of the junction block.

In another aspect, a fuel system with leak diagnostic features includes a plurality of high pressure fuel spaces. A plurality of leak lines are operably positioned to capture fuel leaking from different ones of the high pressure spaces. A leak diagnostic port is fluidly connected to each of the leak lines and is operably positioned to evacuate fuel from different ones of said leak lines.

In still another aspect, a method of diagnosing a leak location in a fuel system for an engine includes a step of capturing fuel from a leak originating from one of a plurality of different high pressure spaces into one of a plurality of separate leak lines. Different leak diagnostic ports are opened until fuel is evacuated from one of the leak lines. The high pressure space that was the origin of the leak is identified by its associated leak line.

DETAILED DESCRIPTION

Figure 1:
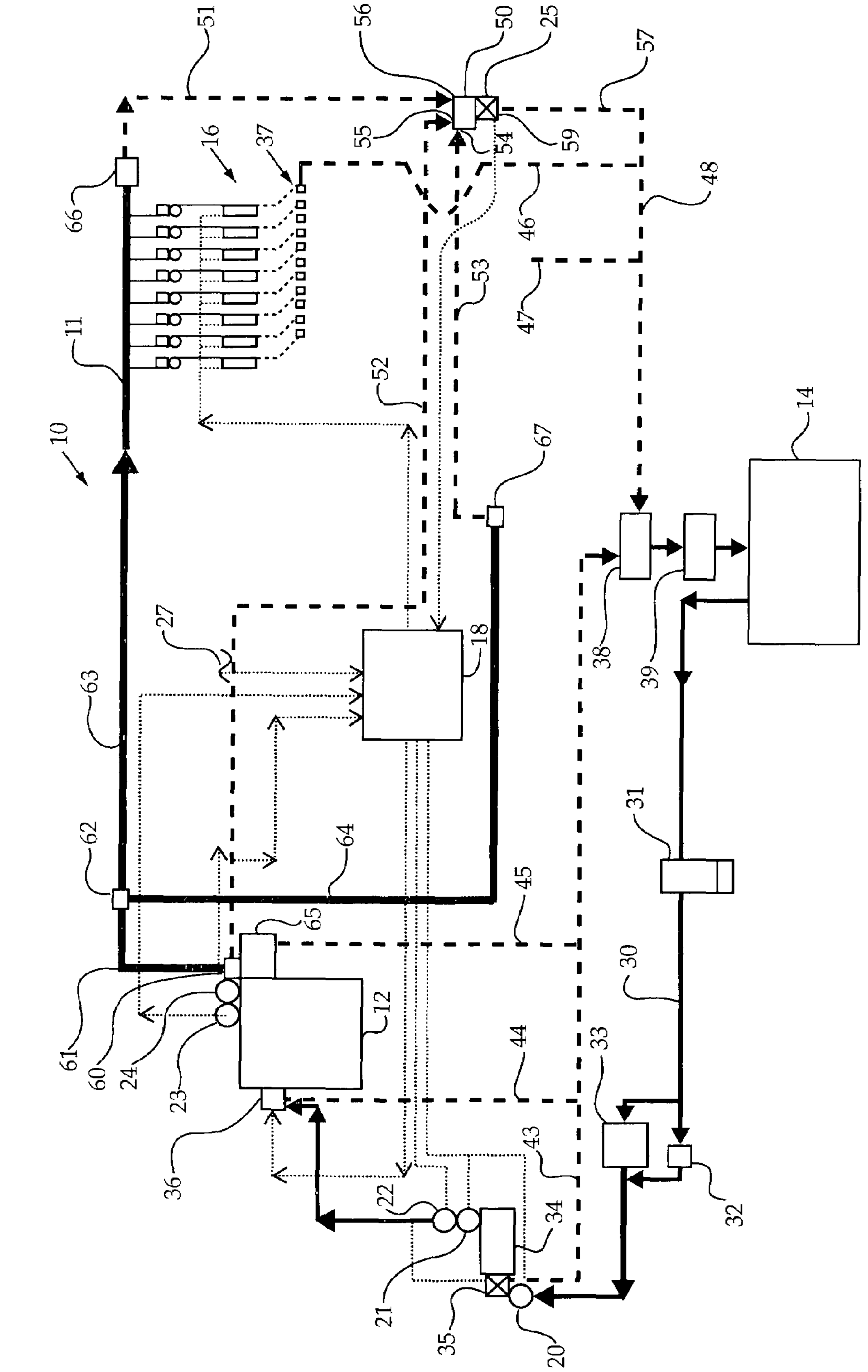
FIG. 1 is a schematic illustration of an engine fuel system employing a leak diagnostic strategy according to the present invention.

Referring to FIG. 1, an example fuel system 10 according to the present invention includes a right hand high pressure common rail 11 with eight associated fuel injectors 16, and a left hand common rail (not shown) associated with eight other fuel injectors (also not shown). Fuel system 10 is used in relation to a 16 cylinder V-type diesel engine, and the left hand rail is not shown, but is identical to the right hand rail and associated fuel injectors. Although the present invention is illustrated in association with a common rail fuel system for a V-type diesel engine, the present invention could find potential application to virtually any fuel system that includes, or could be divided into, a plurality of high pressure spaces. Fuel system 10 includes a high pressure pump 12 that supplies high pressure fuel to right hand common rail 11 and the left hand common rail. Low pressure fuel is supplied to high pressure pump 12 from a fuel tank 14. An electronic control module 18 controls the operation of fuel system 10 in a conventional manner. Fuel system 10 includes many features familiar to those skilled in the art but also includes a leak diagnostic component 50 that is fluidly positioned between leak lines associated with different high pressure spaces and fuel tank 14.

Electronic control module 18 receives sensor inputs from a variety of typical sensors known in the art including an inlet pressure sensor 20, an outlet pressure sensor 21 and a temperature sensor 22 that are associated with pressure regulator 35 and micron filter 34. In addition, electronic control module 18 receives sensor input signals from a temperature sensor 23 and a pump outlet pressure sensor 24 associated with high pressure pump 12. Electronic control module 18 also receives sensor input from a timing wheel sensor line 27 and a wet sensor 25, which is operably positioned to detect a leak from any of several high pressure spaces associated with fuel system 10. Wet sensor 25 is preferably included as a portion of leak diagnostic component 50.

When in operation, low pressure fuel is drawn from tank 14 by either a priming pump 32 or a fuel transfer pump 33 along a fuel supply line 30. Fuel in supply line 30 initially passes through a filter assembly 31, which can include a water separator and possibly a water-in-fuel sensor. The low pressure fuel then arrives at pressure regulator 35, which acts to maintain the fuel pressure in supply line 30 below some threshold pressure by returning excess fuel to tank via regulator return line 43, if necessary. The fluid supply to high pressure pump 12 is controlled by the electronic control module 18 via a flow control valve 36. Depending upon the position of flow control valve 36, a portion of the fuel in supply line 30 is either directed to high pressure pump 12 or back to tank via flow valve return line 44. The output from high pressure pump 12 enters a fuel discharge module 65 on its way to a high pressure supply line 61 via a pump outlet connection 60. Fuel discharge module 65 can include a pressure relief valve and/or a manual drain valve that allows fuel to be returned to tank 14 via a pressure relief return line 45. Any fuel returning to tank via either regulator return line 43, flow valve return line 44 or pressure relief return line 45 pass through a return fuel manifold 38 and a cooler 39 before reentering tank 14.

Since past experience has shown that a leak can occasionally occur at pump outlet connection 60, it and high pressure supply line 61 constitute a high pressure space according to the present invention that is contained within a low pressure envelope in a conventional manner, such as by using a double walled tube. Any fuel that leaks from this high pressure space is captured in a pump output leak line 52 that is fluidly connected at its down stream end to an inlet 55 associated with leak diagnostic component 50. Thus, in the rare occurrence where a leak exists at the high pressure connection 60, that fuel will be captured and returned to tank via leak return line 52.

High pressure supply line 61 is split into a right hand supply line 63 and a left hand supply line 64 at a T-Flange 62. Supply line 63 and 64 are also preferably double walled tubes that create a low pressure envelope around the high pressure lines 63 and 64. The right hand supply line 63 is fluidly connected to right hand common rail 11, which together constitute another high pressure space of fuel system 10. Likewise, left hand supply line 64 and the associated left hand common rail (not shown) constitute a third high pressure space for fuel system 10. Any fuel that leaks from right hand rail 11 and/or supply line 63 is captured by the low pressure envelope and channeled to a right hand leakage connection 66, where the fuel can be captured in right hand leak line 51 for return to tank 14. Right hand leak line 51 is fluidly connected at its downstream end to an inlet 56 associated with leak diagnostic component 50. Likewise, left hand supply line 64 and the left hand common rail constitute another high pressure space that is enclosed in a separate low pressure envelope that leads to left hand leakage connection 67. Thus any fuel leakage that occurs in this high pressure space is captured in left hand leak line 53 that is fluidly connected at its downstream end to an inlet 54, which is also associated with leak diagnostic component 50. Any leakage that is captured by leak return lines 51, 52 or 53 passes through leak diagnostic component 50, past wet sensor 25 and into a consolidated leak like 57, which is fluidly connected to tank 14 via drain line 48. In other words, an upstream end of consolidated leak line 57 is fluidly connected to an outlet 59 from leak diagnostic component 50.

Fuel system 10 also includes several conventional return lines that are associated with fuel injectors 16. For instance, any fuel returned via the normal operation of fuel injectors 16 from the right hand bank enter a right hand injector return manifold 37, and is then channeled to drain line 48 via a right hand fuel injector return line 46. Likewise, any fuel not used by the left hand fuel injectors is fluidly channeled to drain line 48 via a left hand injectors return line 47.

Figure 2:
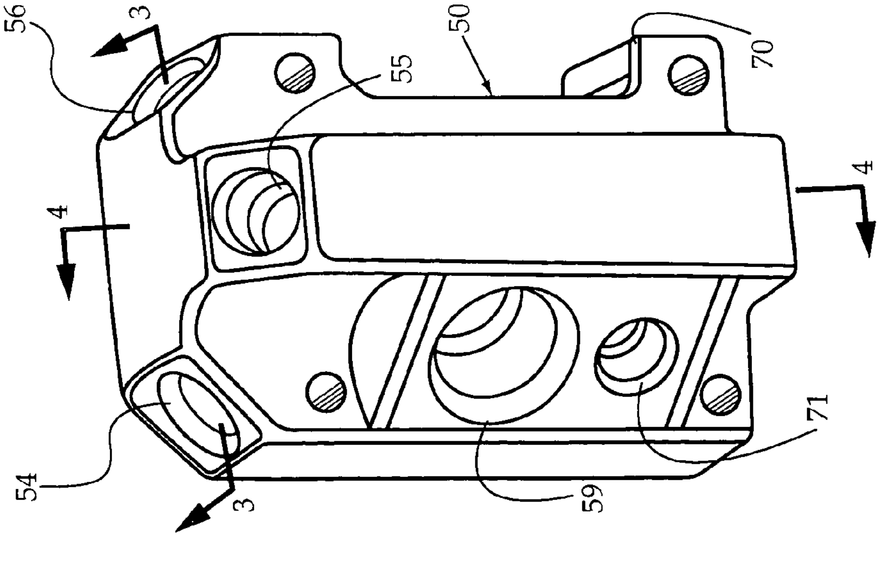
FIG. 2 is an isometric view of a leak detection component for the fuel system of FIG. 1.
Figure 3:
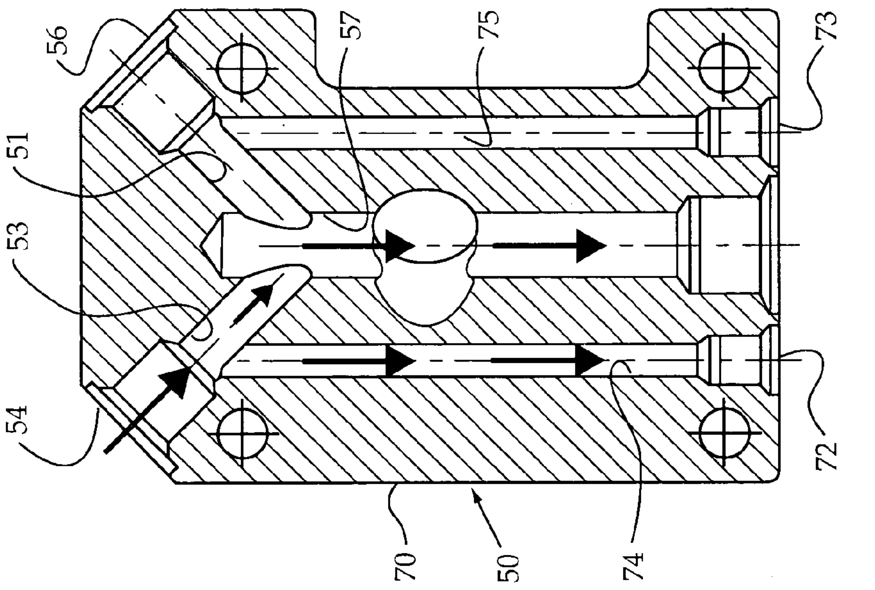
FIG. 3 is a front sectioned view of the leak diagnostic component of FIG. 2 as viewed along section lines 3-3.
Figure 4:
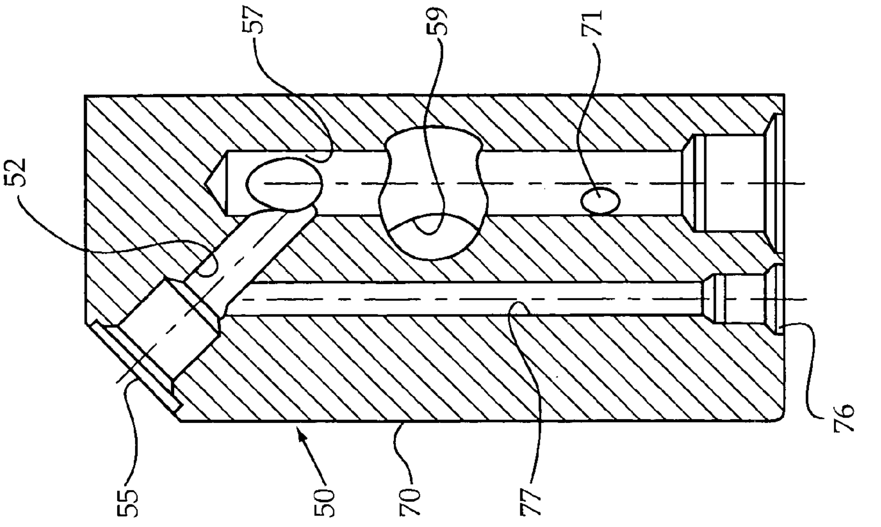
FIG. 4 is a side sectioned view of the leak diagnostic component of FIG. 2 as viewed along section lines 4-4.
Figure 7:
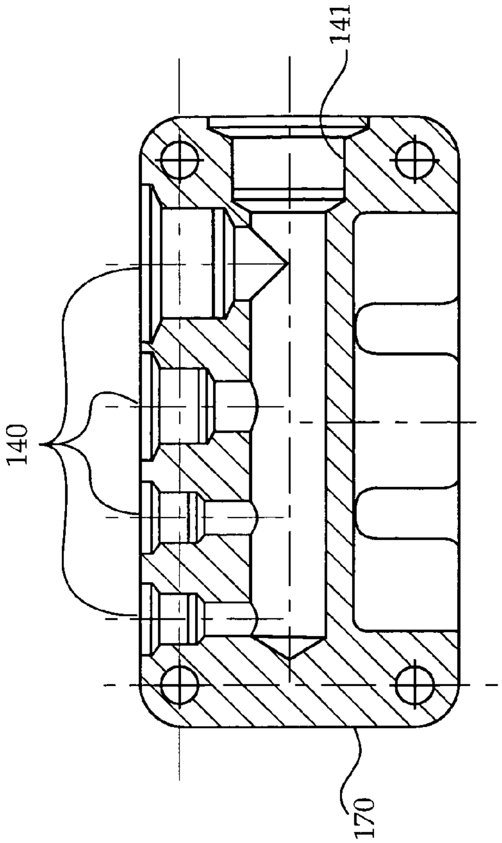
FIG. 7 is a front sectioned view of the leak diagnostic component of FIG. 5 as viewed along section lines 7-7.
Figure 8:
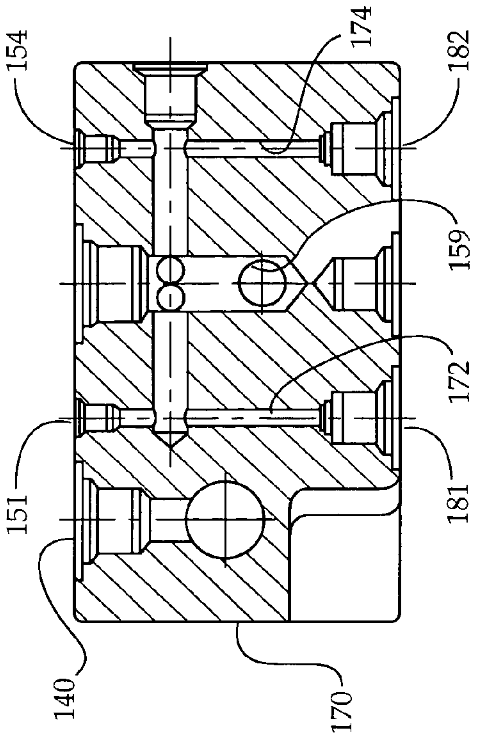
FIG. 8 is a side sectioned view of the leak diagnostic component of FIG. 5 as viewed along section lines 8-8.
Figure 5:
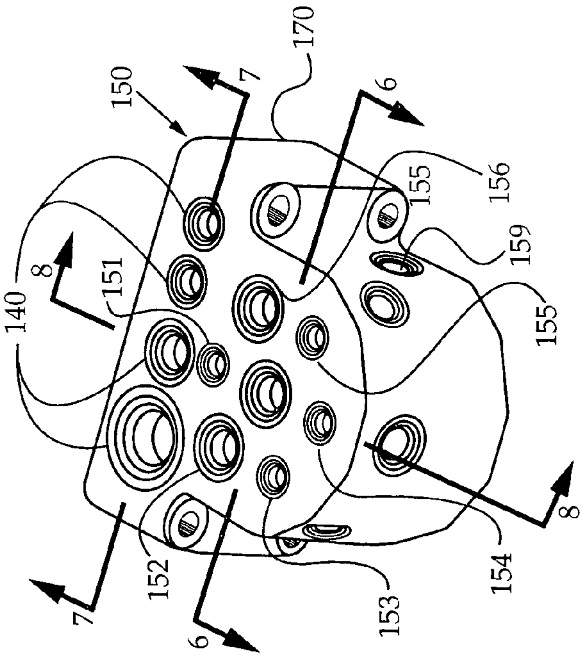
FIG. 5 is an isometric view of a leak diagnostic component according to another aspect of the present invention.
Figure 6:
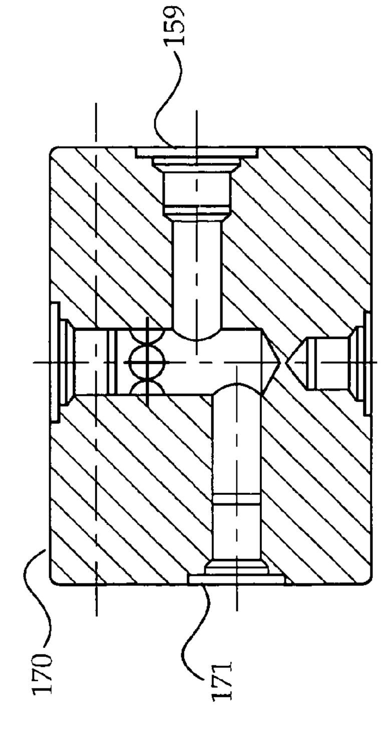
FIG. 6 is a rear sectioned view of the leak diagnostic component of FIG. 5 as viewed along section lines 6-6.

Referring now to FIGS. 2-4, the structure of leak diagnostic component 50 is illustrated. In particular, leak diagnostic component 50 includes a metallic junction block 70 that is mounted at a suitable location on or adjacent the engine associated with fuel system 10. Junction block 70 is formed to include inlets 54, 55, and 56, which are each fluidly connected to the separated leak lines 53, 52 and 51, respectively, as shown in FIG. 1. Within junction block 70, each of the leak lines 51, 52 and 53 has an associated leak collection cavity 75, 74 and 77, respectively. Thus, any fuel traveling in leak return line 51 is initially channeled to leak collection cavity 75 before overflowing into consolidated leak line 57. Likewise, any leakage in return line 51 first fills leak collection cavity 77 before overflowing into consolidated leak line 57. Finally, any leakage that is captured in leak line 53 is first channeled to leak collection cavity 74 before overflowing into consolidated leak line 57. Each of the leak collection cavities 74, 75 and 77 has an associated leak diagnostic port 72, 73 and 76, respectively. The leak diagnostic port 72, 73 and 76 extend between the respective leak collection cavities and an outer surface of junction block 70. Component 50 is preferably oriented such that gravity will maintain fuel, if any, in the respective leak diagnostic cavities. When installed in the fuel system 10 of FIG. 1, a separate plug is placed in each of the leak diagnostic ports 72, 73 and 76. These plugs are preferably removable and can take on a wide variety of structures known in the art that allow for leak diagnostic ports 72, 73 and 76 to normally be maintained closed but allow each to be opened, preferably manually by a technician seeking to diagnose a leak location.

Junction block 70 is also formed to include a wet sensor port 71 within which is mounted a wet sensor 25 (FIG. 1) so as to be in fluid contact with consolidated leak line 57. Finally, Junction block 70 is machined to include an outlet 59 that allows component 50 to be fluidly connected to an external portion of consolidated leak line 57 as shown in FIG. 1. Thus, any fuel that leaks into one of the return lines is first collected in a separate leak collection cavity and then overflows into a consolidated leak line 57 where the leak is detected by the wet sensor 25, which provides an alert to an operator in a conventional manner. For instance, the wet sensor can be operably connected to the electronic control module 18, as shown in FIG. 1, where some suitable alert is provided to an operator by the electronic control module in a conventional manner.

Although the embodiment of FIGS. 1-4 shows three separate leak lines, those skilled in the art will appreciate that the fuel system 10 can be subdivided into including any number of separate high pressure spaces with separate leak lines for a more sophisticated version of the present invention. For instance, in one extreme, each fuel injector could have a separate leak detection line. In any event, when applied to a specific fuel system and engine, it might be desirable to increase the number of leak lines in order to further isolate separate high pressure spaces of the fuel system in order to better enable a diagnosis of a leak location, should a leak occur. For instance, FIGS. 5-8 show a leak diagnostic component 150 according to another aspect of the present invention that includes six separate leak inlets 151-156, which would be fluidly connected to different high pressure spaces associated with a different engine. For instance, inlets 151 and 152 might be fluidly connected to different high pressure distribution blocks, inlets 153 and 154 could be fluidly connected to leak lines associated with two different high pressure pump connections, and inlets 155 and 156 could be fluidly connected to leak lines associated with two separate high pressure rails for the fuel system of an engine according to another application of the present invention. Each of the separate six leak inlets 151-156 has a separate leak collection cavity that is fluidly positioned between the inlet and a common outlet 159. Thus, fuel entering one of the inlets 151-156 will first collect in a separate leak collection cavity before overflowing into a common leak return line fluidly connected to outlet 159. Upstream of common outlet 159, junction block 170 includes a wet sensor port 171 within which is mounted a wet sensor, which could be similar to wet sensor 25 identified in FIG. 1. Thus, before exiting junction block 170, any leakage would be detected by the wet sensor before exiting at outlet 159. Each of the leak collection cavities is fluidly connected to a leak diagnostic port that opens through an outer surface of junction block 170. For instance, leak inlet 151 is fluidly connected to a leak collection cavity 172, which is separated from the outer surface of junction block 170 by leak diagnostic port 181. Several of the internal fluid connections are facilitated by unnumbered radial cross bores that have their openings plugged in the finished component. Leak inlet 154 is fluidly connected to a leak collection cavity 174 and a leak diagnostic port 182. As in the previous embodiment, the leak diagnostic ports 181 are preferably plugged in a suitable manner during normal operation of the engine. Although not shown, each of the six inlets 151-156 has a separate leak collection cavity and a separate leak diagnostic port associated therewith. In order to consolidate different components and associated ports, junction block 170 also includes a fuel return manifold that includes fuel return inlets 140 and a return manifold outlet 141. Those skilled in the art will appreciate that the return manifold inlets 140 would likely be fluidly connected to different fuel injector return lines, a pressure regulator return line, or any other return line known in the art.

INDUSTRIAL APPLICABILITY

Although the present invention has been illustrated in the context of a common rail fuel system for a diesel engine, the present invention could find potential application in any fuel system with two or more potential leak locations that can be fluidly isolated from one another via separate leak lines. Although the present invention is particularly well suited to common rail fuel systems, it could find potential application in other fuel systems that include even cyclic high pressure spaces, such as a pump and line fuel system.

When implementing the invention, engineers will normally have to arrive at a compromise as to how many leak lines to employ verses cost and how many different potential leak locations are likely. The invention is then implemented by separately enclosing each of the different high pressure spaces in a low pressure envelope, such as by using double walled tubes as supply lines and the like. Each of these low pressure envelopes is fluidly connected to a separate leak line. Each of the separate leak lines is fluidly connected to a different inlet in a leak diagnostic component according to the present invention. Any leakage that might occur in one of those leak lines is first captured by the leak line and then fills a leak diagnostic cavity before overflowing into a common leak line fluidly connected to tank. After an operator is alerted to the presence of a leak, which will occur due to a wet sensor in the consolidated leak line detecting the presence of fuel, the technician can open different leak diagnostic ports until fuel is evacuated from an associated leak collection cavity. By knowing which high pressure space is associated with that leak diagnostic port, the technician can quickly diagnose which high pressure space is leaking fuel, so as to more quickly implement a repair.

In the preferred embodiment of the present invention, the engine is preferably not running when the diagnostic procedure is preformed. In other words, after an operator is alerted to the presence of a leak, such as via the wet sensor described in relation to the fuel system of FIG. 1, the engine is shut down. Then, the technician sequentially opens different diagnostic ports until the one with fuel in its leak collection cavity is evacuated through the leak diagnostic port. The technician then associates that leak diagnostic port with a certain high pressure space of the fuel system. The technician then can proceed to repairing the leak in the high pressure space indicated by leak diagnostic cavity containing fuel. In order to further hasten the leak diagnostic procedure, all of the leak diagnostic ports are preferably located on a single surface of the leak diagnostic junction block, rather than scattered at different locations around the engine.

Although the present invention has been illustrated in the context of a leak diagnostic component with several inlets fluidly connected to separate leak lines, the present invention could also be implemented in another way. For instance, instead of the leak diagnostic junction block, the present invention could be employed by simply positioning an evacuation valve in each of the leak lines. With the engine running and a leak occurring, a technician could simply open different ones of the evacuation valves until fuel from one of the leak lines poured into a container held under the valve by the technician. The technician could then shut the engine down and proceed to repair the leak at the high pressure space associated with the leak line having the fuel therein. Thus, in that alternative, each of the valves would be considered a leak diagnostic port, and would normally be maintained in a closed position during normal operation of the engine, such as via a spring bias or the like.

Those skilled in the art will appreciate that the present invention can be implemented in various levels of sophistication depending upon the specific application. For instance, the invention is preferably implemented by dividing the high pressure spaces of a fuel system into separate places where leakage could occur. For instance, each fluid connection could be a potential leakage location and could be isolated with a separate leak line according to the present invention. In a more sophisticated version of the invention, which is not shown, each and every fuel injector could have a separate leak detection line associated with its high pressure fuel connections. However, those skilled in the art will appreciate that the number of separate leak lines should be balanced against cost and a likelihood of a leak occurring at that different location, as well as how difficult it is to access different leak locations for repairs and the like. The present invention is advantageous because is allows a leak location to be quickly diagnosed without having to employ more than one wet sensor for the entire fuel system. This advantage not only decreases the number of sensors on the engine by also can substantially reduce down time if a leak should occur, and reduce the expenses associated with a repair by allowing the technician to more quickly find and repair the leak.

It should be understood that the above description is intended for illustrative purposes only, and is not intended to limit the scope of the present invention in any way. Thus, those skilled in the art will appreciate that other aspects, objects and advantages of this invention can be obtained from a study of the drawings, the disclosure and the appended claims.

What is claimed is:

1. A leak diagnosis component for a fuel system of an engine comprising:

a junction block with a plurality of inlets and at least one outlet disposed in said junction block and opening through an external surface of said junction block;

said inlets being fluidly connected to said at least one outlet via a plurality of leak paths disposed in said junction block, and each of said inlets being configured for connection to a different leak line of a fuel system for an engine;

a plurality of leak collection cavities disposed in said junction block, and each of said leak paths being fluidly connected to one of the plurality of leak collection cavities; and a plurality of leak diagnostic ports disposed in said junction block, and each one of the plurality of leak diagnostic ports extending between a respective one of said leak collection cavities and said external surface of said junction block.

2. The component of claim 1 including a plurality of plugs removably attached to said junction block and closing different ones of said leak diagnostic ports.

3. The component of claim 2 including a wet sensor attached to said junction block and being operably positioned to sense a presence of liquid in said at least one outlet.

4. The component of claim 3 wherein said at least one outlet is a single outlet.

5. The component of claim 3 wherein said junction block has six leak inlets, six leak collection cavities, six leak diagnostic ports, and includes a separate return fuel manifold disposed therein.

6. The component of claim 4 wherein said external surface includes a top side; and said inlets opening through said external surface at a location closer to said top side than a location where said single outlet opens through said external surface.

7. The component of claim 6 wherein said external surface includes a bottom side; and said leak diagnostic ports opening through said external surface at a location closer to said bottom side than a location where said inlets open through said external surface.

8. The component of claim 4 wherein said junction block has three leak inlets, three leak collection cavities, and three leak diagnostic ports.

9. A fuel system comprising:

a plurality of high pressure fuel spaces;

a plurality of leak lines operably connected to capture fuel leaking from different ones of said high pressure fuel spaces;

each one of a plurality of leak diagnostic ports being fluidly connected to a different one of said leak lines, and the plurality of leak diagnostic ports being operably positioned to evacuate fuel from said leak lines;

a consolidated leak line with one end fluidly connected to said leak lines;

a wet sensor operably connected to said consolidated leak line; and wherein said one end of said consolidated leak line, said leak diagnostic ports and one end of each of said leak lines being disposed in a leak diagnostic junction block.

10. The fuel system of claim 9 wherein said plurality of high pressure spaces include at least one common rail and a pump outlet.

11. The fuel system of claim 10 wherein said leak diagnostic junction block has three inlets, and one of said three inlets is fluidly connected to a pump outlet leak line, a second of said three inlets is fluidly connected to a first common rail leak line, and a third of said three inlets is fluidly connected to a second common rail leak line.

12. The fuel system of claim 10 wherein said leak diagnostic junction block has six leak inlets and includes a separate return fuel manifold.

13. A method of diagnosing a leak location in a fuel system for an engine, comprising the steps of:

capturing fuel from a leak originating from one of a plurality of different high pressure spaces into one of a plurality of separate leak lines;

opening different leak diagnostic ports until fuel is evacuated from one of the leak lines; and identifying which one of the high pressure spaces is associated with the one of the leak lines.

14. The method of claim 13 including a step of detecting a leak in a consolidated leak line prior to the opening step.

15. The method of claim 14 including a step of fluidly positioning a leak collection cavity for each of the leak lines upstream from a respective leak diagnostic port for that leak line.

16. The method of claim 15 including a step of locating each of the leak diagnostic ports to open at a single surface adjacent the engine.

* * * * *